(12) United States Patent
Bae et al.

(10) Patent No.: US 11,236,196 B2
(45) Date of Patent: *Feb. 1, 2022

(54) POLYMERS AND METHODS FOR THEIR MANUFACTURE

(71) Applicant: Rensselaer Polytechnic Institute, Troy, NY (US)

(72) Inventors: Chulsung Bae, Cohoes, NY (US); Woo-Hyung Lee, Siheung-Si (KR)

(73) Assignee: Rensselaer Polytechnic Institute, Troy, NY (US)

( * ) Notice: Subject to any disclaimer, the term of this patent is extended or adjusted under 35 U.S.C. 154(b) by 28 days.

This patent is subject to a terminal disclaimer.

(21) Appl. No.: 16/788,506

(22) Filed: Feb. 12, 2020

(65) Prior Publication Data

US 2020/0172659 A1 Jun. 4, 2020

Related U.S. Application Data

(60) Continuation-in-part of application No. 16/553,965, filed on Aug. 28, 2019, which is a division of
(Continued)

(51) Int. Cl.
*C08G 61/02* (2006.01)
*C25B 13/08* (2006.01)
(Continued)

(52) U.S. Cl.
CPC ............. *C08G 61/02* (2013.01); *A01N 29/00* (2013.01); *C08G 10/00* (2013.01); *C09D 5/14* (2013.01);
(Continued)

(58) Field of Classification Search
CPC .. C08G 61/02; C08G 10/00; C08G 2261/124; C08G 2261/146; C08G 2261/20;
(Continued)

(56) References Cited

U.S. PATENT DOCUMENTS 6,590,067 B2 7/2003 Kerres et al.
7,078,121 B2 7/2006 Kanaoka et al.
(Continued)

FOREIGN PATENT DOCUMENTS

CN 102869448 1/2013
CN 103694490 4/2014
(Continued)

OTHER PUBLICATIONS

Office Action dated Sep. 10, 2020, in U.S. Appl. No. 16/471,358.
(Continued)

*Primary Examiner* — Shane Fang
(74) *Attorney, Agent, or Firm* — Weaver Austin Villeneuve & Sampson LLP

(57) ABSTRACT

Embodiments of the invention relate to a novel class of polymers with superior mechanical properties and chemical stability, as compared to known polymers. These polymers are particularly well suited for use in anion exchange membranes (AEMs), including those employed in fuel cells. Novel methods for the manufacture of these polymers are also described.

18 Claims, 5 Drawing Sheets

Related U.S. Application Data application No. 15/527,967, filed as application No. PCT/US2015/061036 on Nov. 17, 2015, now Pat. No. 10,435,504.

(60) Provisional application No. 62/081,144, filed on Nov. 18, 2014, provisional application No. 62/804,634, filed on Feb. 12, 2019.

(51) Int. Cl.
| | |
|---|---|
| C09D 165/00 | (2006.01) |
| C09D 5/14 | (2006.01) |
| A01N 29/00 | (2006.01) |
| H01M 8/1072 | (2016.01) |
| H01M 8/1039 | (2016.01) |
| C08G 10/00 | (2006.01) |
| H01M 8/1004 | (2016.01) |

(52) U.S. Cl.
CPC ............ *C09D 165/00* (2013.01); *C25B 13/08* (2013.01); *H01M 8/1004* (2013.01); *H01M 8/1039* (2013.01); *H01M 8/1072* (2013.01); *C08G 2261/124* (2013.01); *C08G 2261/146* (2013.01); *C08G 2261/20* (2013.01); *C08G 2261/312* (2013.01); *C08G 2261/332* (2013.01); *C08G 2261/45* (2013.01); *Y02P 70/50* (2015.11)

(58) Field of Classification Search
CPC ........ C08G 2261/312; C08G 2261/332; C08G 2261/45; A01N 29/00; C09D 5/14; C09D 165/00; C25B 13/08; H01M 8/1004; H01M 8/1039; H01M 8/1072; Y02P 70/50
See application file for complete search history.

(56) References Cited

U.S. PATENT DOCUMENTS

| | | | |
|---|---|---|---|
| 7,615,300 | B2 | 11/2009 | Bae |
| 7,671,157 | B2 | 3/2010 | Bae |
| 7,888,397 | B1 | 2/2011 | Hibbs et al. |
| 8,445,141 | B2 | 5/2013 | Kitamura et al. |
| 8,809,483 | B1 | 8/2014 | Hibbs et al. |
| 9,051,431 | B2 | 6/2015 | Kim et al. |
| 9,276,282 | B2 | 3/2016 | Zhang et al. |
| 9,534,097 | B2 | 1/2017 | Hibbs |
| 9,580,541 | B1 | 2/2017 | Fujimoto et al. |
| 10,053,534 | B2 | 8/2018 | Fujimoto |
| 10,053,535 | B2 | 8/2018 | Kim et al. |
| 10,272,424 | B2 | 4/2019 | Bae et al. |
| 10,290,890 | B2 | 5/2019 | Yan et al. |
| 10,294,325 | B2 | 5/2019 | Fujimoto |
| 10,370,483 | B2 | 8/2019 | Kim et al. |
| 10,435,504 | B2 | 10/2019 | Bae et al. |
| 2002/0061431 | A1 | 5/2002 | Koyama et al. |
| 2002/0062046 | A1 | 5/2002 | Swan et al. |
| 2003/0056669 | A1 | 3/2003 | Miller et al. |
| 2003/0114598 | A1 | 6/2003 | Li et al. |
| 2003/0134936 | A1 | 7/2003 | West et al. |
| 2003/0173547 | A1 | 9/2003 | Yamakawa et al. |
| 2006/0004177 | A1 | 1/2006 | Gao et al. |
| 2006/0135702 | A1 | 6/2006 | Wang et al. |
| 2007/0048579 | A1 | 3/2007 | Bae |
| 2008/0262163 | A1 | 10/2008 | Bae |
| 2009/0004528 | A1 | 1/2009 | Fritsch et al. |
| 2009/0280383 | A1 | 11/2009 | MacKinnon et al. |
| 2010/0041834 | A1 | 2/2010 | Bae |
| 2010/0047657 | A1 | 2/2010 | MacKinnon et al. |
| 2010/0279204 | A1 | 11/2010 | Isomura et al. |
| 2011/0207028 | A1 | 8/2011 | Fukuta et al. |
| 2014/0024728 | A1 | 1/2014 | Kim et al. |
| 2014/0227627 | A1 | 8/2014 | He et al. |
| 2014/0275300 | A1* | 9/2014 | Kim .................. C08G 75/20 521/25 |
| 2014/0353241 | A1 | 12/2014 | Yin et al. |
| 2015/0111128 | A1 | 4/2015 | Matsuda et al. |
| 2017/0203289 | A1 | 7/2017 | Bae et al. |
| 2017/0252707 | A1 | 9/2017 | Bahar et al. |
| 2017/0355811 | A1 | 12/2017 | Bae et al. |
| 2019/0308185 | A1 | 10/2019 | Bae et al. |
| 2020/0055980 | A1 | 2/2020 | Bae et al. |
| 2020/0091535 | A1 | 3/2020 | Bae et al. |
| 2020/0094241 | A1 | 3/2020 | Bae et al. |
| 2020/0172659 | A1 | 6/2020 | Bae et al. |
| 2020/0223997 | A1 | 7/2020 | Bae et al. |
| 2020/0238272 | A1 | 7/2020 | Bae et al. |
| 2021/0108067 | A1 | 4/2021 | Bae et al. |

FOREIGN PATENT DOCUMENTS

| | | |
|---|---|---|
| CN | 106040318 | 10/2016 |
| EP | 2324529 | 1/2016 |
| JP | H06188005 | 7/1994 |
| JP | 2001-002738 | 1/2001 |
| JP | H15203648 | 7/2003 |
| JP | 2004-131662 | 4/2004 |
| JP | 2012-049111 | 3/2012 |
| JP | 2013-505825 A | 2/2013 |
| JP | 2016-032098 A | 3/2016 |
| JP | 2018-502180 | 1/2018 |
| KR | 20140064308 | 5/2014 |
| KR | 20150060159 | 6/2015 |
| WO | WO2006/066505 | 6/2006 |
| WO | WO2007/079004 | 7/2007 |
| WO | WO2012/081026 | 6/2012 |
| WO | WO2016/014636 | 1/2016 |
| WO | WO2016/081432 | 5/2016 |
| WO | WO2017/172824 | 10/2017 |
| WO | WO2019/010290 | 1/2019 |
| WO | WO2019/068051 | 4/2019 |
| WO | WO2018/119020 | 6/2019 |

OTHER PUBLICATIONS

Office Action dated Feb. 25, 2021, in U.S. Appl. No. 16/471,358.
Final Office Action dated Jun. 3, 2021, in U.S. Appl. No. 16/471,358.
Office Action dated Jan. 6, 2021, for U.S. Appl. No. 16/628,879.
Ex Parte Quayle Action dated Mar. 5, 2019, in U.S. Appl. No. 15/527,967.
Notice of Allowance dated May 29, 2019, in U.S. Appl. No. 15/527,967.
Office Action dated May 25, 2021, in U.S. Appl. No. 16/553,965.
International Search Report and Written Opinion dated Mar. 6, 2018, in Application No. PCT/US2017/067482.
International Preliminary Report on Patentability dated Jun. 25, 2019 in Application No. PCT/US2017/067482.
International Search Report and Written Opinion dated Nov. 30, 2018 in Application No. PCT/US2018/040898.
International Search Report dated Dec. 4, 2018 in Application No. PCT/US2018/040898.
International Preliminary Report on Patentability dated Jan. 7, 2020 in Application No. PCT/US2018/040898.
International Search Report and Written Opinion dated Feb. 4, 2016, in Application No. PCT/US2015/061036.
International Preliminary Report on Patentability dated May 23, 2017, in Application No. PCT/US2015/061036.
CN Search Report dated Oct. 29, 2019 in Application No. 201580062578.2.
CN Supplemental Search Report dated Mar. 25, 2020 in Application No. 201580062578.2.
EP Supplemental Search Report and Written Opinion dated Jun. 15, 2018, in Application No. 15860054.4.
EP Office Action dated May 12, 2020, in Application No. 15860054.4.
JP Search Report by Authorized Searching Authority dated Sep. 18, 2018 for Application No. 2017-526894.

(56) References Cited

OTHER PUBLICATIONS

JP Notice of Refusal dated Oct. 23, 2019 for Application No. 2017-526894.
JP Notice of Refusal dated May 12, 2020 for Application No. 2017-526894.
JP Notice of Refusal dated Dec. 15, 2020 for Application No. 2020-008602.
JP Search Report by Authorized Searching Authority dated Nov. 17, 2020 for Application No. 2020-008602.
International Search Report and Written Opinion dated Sep. 16, 2019, in Application No. PCT/US2019/028925.
International Preliminary Report on Patentability dated Oct. 27, 2020, in Application No. PCT/US2019/028925.
International Search Report and Written Opinion dated Mar. 25, 2020, in Application No. PCT/US2019/063173.
International Search Report and Written Opinion dated May 27, 2021, in Application No. PCT/US2021/014759.
Adhikari S et al., "Ionomers for Electrochemical Energy Conversion & Storage Technologies," Polymer, 2020, 123080.
Ayers K, "Benchmarking Advanced Water Splitting Technologies: Best Practices in Materials Characterization," presented at the 2020 U.S. Department of Energy Hydrogen and Fuel Cells Program Annual Merit Review and Peer Evaluation Meeting on May 20, 2020, accessible at https://www.hydrogen.energy.gov/pdfs/review20/p170_ayers_2020_o.pdf (last accessed Dec. 15, 2020), 21 pp.
Ayers K, "Economic Production of Hydrogen through the Development of Novel, High Efficiency Electrocatalysts for Alkaline Membrane Electrolysis", presented at the 2017 U.S. Department of Energy (DOE) Hydrogen and Fuel Cells Program and Vehicle Technologies Office Annual Merit Review and Peer Evaluation Meeting on Jun. 5-9, 2017 in Washington, D.C., accessible at https://www.hydrogen.energy.gov/pdfs/review17/pd147_ayers_2017_o.pdf (last accessed Dec. 15, 2020), 29 pp.
Bae C et al., "Cyclic Olefin Copolymer-Based Alkaline Exchange Polymers and Reinforced Membranes" in 2019 Annual Progress Report: DOE Hydrogen and Fuel Cells Program, U.S. Department of Energy, Document No. DOE/GO-102020-5257, Apr. 2020, accessible at https://www.hydrogen.energy.gov/pdfs/progress19/fc_fc307_bae_2019.pdf (last accessed Dec. 15, 2020), 5 pp.
Bae C, "Cyclic Olefin Copolymer based Alkaline Exchange Polymers and Reinforced Membranes," presented at the 2019 U.S. Department of Energy (DOE) Hydrogen and Fuel Cells Program Annual Merit Review and Peer Evaluation Meeting on Apr. 29-May 1, 2019 in Crystal City, Virginia, accessible at https://www.hydrogen.energy.gov/pdfs/review19/fc307_bae_2019_p.pdf (last accessed Dec. 15, 2020), 13 pp.
Bae C, "Channeling Engineering of Hydroxide Ion Exchange Polymers and Reinforced Membranes," presented at the 2019 U.S. Department of Energy (DOE) Hydrogen and Fuel Cells Program Annual Merit Review and Peer Evaluation Meeting on Apr. 29-May 1, 2019 in Crystal City, Virginia, accessible at https://www.hydrogen.energy.gov/pdfs/review19/arpae09_bae_2019_p.pdf (last accessed Dec. 15, 2020), 26 pp.
Bae C, "Cyclic Olefin Copolymer based Alkaline Exchange Polymers and Reinforced Membranes," presented at the 2020 U.S. Department of Energy Hydrogen and Fuel Cells Program Annual Merit Review and Peer Evaluation Meeting on May 19, 2020, accessible at https://www.hydrogen.energy.gov/pdfs/review20/fc307_bae_2020_o.pdf (last accessed Dec. 15, 2020), 21 pp.
Bae C, "Development of Versatile Polymer Materials for Anion Exchange Membranes in Electrochemical Energy Conversion Technology," ECS Meeting Abstracts, 2020, MA2020-02, 2363 (1 p.).
Bae C, "Ion Conducting Polymer Electrolyte Membranes for Energy Conversion Technology," presented at the Rensselaer Polytechnic Institute Center for Future Energy Systems (RPI CFES) Symposium on Apr. 10, 2019 in Troy, New York, accessible at https://cfes.rpi.edu/sites/default/files/A7%20Bae.pdf (last accessed Dec. 15, 2020), 19 pp.
Bae C, "New functional polymers for alternative energy applications," presented at University of Nevada, Las Vegas (UNLV) Renewable Energy Symposium on Aug. 20, 2008 in Las Vegas, Nevada, accessible at https://digitalscholarship.unlv.edu/cgi/viewcontent.cgi?article=1023&context=res (last accessed Jan. 16, 2021), 21 pp.
Black SB et al., "FTIR characterization of water-polymer interactions in superacid polymers," The Journal of Physical Chemistry B, 2013, 117 (50), 16266-16274.
Briem M et al., "Comparison of Novel 1, 1-Diphenylethylene Alternating Copolymer and Polystyrene Based Anion Exchange Membranes," ECS Meeting Abstracts, 2020, MA2020-2, 2242 with Presentation (31 pp.).
Brownell LV et al., "Synthesis of polar block grafted syndiotactic polystyrenes via a combination of iridium-catalyzed activation of aromatic C—H bonds and atom transfer radical polymerization," Journal of Polymer Science Part A: Polymer Chemistry, 2009, 47(23), 6655-6667.
Chang Y et al., "Acidity Effect on Proton Conductivity of Hydrocarbon-Based Ionomers," ECS Transactions, 2010, 33 (1), 735.
Chang Y et al., "Aromatic ionomers with highly acidic sulfonate groups: acidity, hydration, and proton conductivity," Macromolecules, 2011, 44 (21), 8458-8469.
Chang Y et al., "Direct Fluorination of the Carbonyl Group of Benzophenones Using Deoxo-Fluor®: Preparation of Bis (4-Fluorophenyl) Difluoromethane," Organic Syntheses, 2010, 87, 245-252.
Chang Y et al., "Direct nucleophilic fluorination of carbonyl groups of benzophenones and benzils with Deoxofluor," Tetrahedron, 2008, 64 (42), 9837-9842.
Chang Y et al., "Effect of superacidic side chain structures on high conductivity aromatic polymer fuel cell membranes," Macromolecules, 2015, 48(19), 7117-7126.
Chang Y et al., "Partially fluorinated sulfonated poly (ether amide) fuel cell membranes: influence of chemical structure on membrane properties," Polymers 3(1), 222-235.
Chang Y et al., "Poly (Arylene Ether Sulfone) Ionomers with Different Acidity Strengths and Fuel Cell Membrane Properties," ECS Transactions, 2013, 50(2), 1031.
Chang Y et al., "Polymer electrolyte membranes based on poly (arylene ether sulfone) with pendant perfluorosulfonic acid," Polymer Chemistry, 2013, 4(2), 272-281.
Chang Y et al., "Polymer-supported acid catalysis in organic synthesis," Current Organic Synthesis, 2011, 8 (2), 208-236.
Chang Y et al., "Polystyrene Ionomers Functionalized with Partially Fluorinated Short Side-Chain Sulfonic Acid for Fuel Cell Membrane Applications," in Sustainable Membrane Technology for Energy, Water, and Environment, Ismail AF & Matsuura T (eds.), John Wiley & Sons, 2012, pp. 243-249.
Chang Y et al., "Polystyrene-Based Superacidic Ionomers: Synthesis and Proton Exchange Membrane Applications," ECS Transactions, 2011, 41 (1), 1615.
Chang Y et al., "Polystyrene-based superacidic solid acid catalyst: synthesis and its application in biodiesel production," RSC advances, 2014, 4 (88), 47448-47454.
Chang Y et al., "Scope and regioselectivity of iridium-catalyzed C—H borylation of aromatic main-chain polymers," Macromolecules, 2013, 46 (5), 1754-1764.
Chung HT et al., "Effect of organic cations on hydrogen oxidation reaction of carbon supported platinum," Journal of The Electrochemical Society, 2016, 163(14), F1503-F1509.
Dang H et al., "Poly(phenylene oxide) functionalized with quaternary ammonium groups via flexible alkyl spacers for High-Performance anion exchange membranes," Journal of Materials Chemistry A, 2015, 3, 5280-5284.
Date B et al., "Synthesis and morphology study of SEBS triblock copolymers functionalized with sulfonate and phosphonate groups for proton exchange membrane fuel cells," Macromolecules, 2018, 51(3), 1020-1030.
Einsla ML et al., "Toward improved conductivity of sulfonated aromatic proton exchange membranes at low relative humidity," Chemistry of Materials, 2008, 20, 5636-5642.
Gottesfeld S et al., "Anion exchange membrane fuel cells: Current status and remaining challenges," Journal of Power Sources, 2018, 375, 170-184.

(56) References Cited

OTHER PUBLICATIONS

Gottesfeld S et al., "Direct ammonia fuel cells (DAFCs) for transport application," presented at the 2019 U.S. Department of Energy (DOE) Hydrogen and Fuel Cells Program Annual Merit Review and Peer Evaluation Meeting on Apr. 29-May 1, 2019 in Crystal City, Virginia, accessible at https://www.hydrogen.energy.gov/pdfs/review19/arpae09_bae_2019_p.pdf (last accessed Dec. 15, 2020), 26 pp.

Guzman-Guiterrez, et al., "Dramatic Enhancement of Superacid-Catalyzed Polyhydroxyalkylation Reactions," Macromolecules, 2011, 44, pp. 194-202.

Han KW et al., "Molecular dynamics simulation study of a polysulfone-based anion exchange membrane in comparison with the proton exchange membrane," The Journal of Physical Chemistry C, 2014, 118(24), 12577-12587.

Hao J et al., "Crosslinked high-performance anion exchange membranes based on poly(styrene-b-(ethylene-co-butylene)-b-styrene)," Journal of Membrane Science, 2018, 551, 66-75.

Henkensmeier D et al., "Overview: State-of-the Art Commercial Membranes for Anion Exchange Membrane Water Electrolysis," Journal of Electrochemical Energy Conversion and Storage, 2021, 18, 024001 (18 pp.).

Hickner M et al., "Membrane Databases—New Schema and Dissemination (Supplement to: Development of Design Rules for High Hydroxide Transport in Polymer Architectures)," at the 2019 U.S. Department of Energy (DOE) Hydrogen and Fuel Cells Program Annual Merit Review and Peer Evaluation Meeting on Apr. 29-May 1, 2019 in Crystal City, Virginia, accessible at https://www.hydrogen.energy.gov/pdfs/review19/ia022_hickner_2019_p.pdf (last accessed Dec. 15, 2020), 14 pp.

Hwang T et al., "Ultrafiltration using graphene oxide surface-embedded polysulfone membranes," Separation and Purification Technology, 2016, 166, 41-47.

Jeon JY et al., "Ionic Functionalization of Polystyrene-b-poly(ethylene-co-butylene)-b-polstyrene via Friedel-Crafts Bromoalkylation and its Application for Anion Exchange Membranes," ECS Transactions, 2017, 80, 967-970.

Jeon JY et al., "Efficient Preparation of Styrene Block Copolymer Anion Exchange Membranes via One-Step Friedel-Crafts Bromoalkylation with Alkenes," Organic Process Research & Development, 2019, 23(8), 1580-1586.

Jeon JY et al., "Functionalization of Syndiotactic Polystyrene via Superacid-Catalyzed Friedel-Crafts Alkylation," Topics in Catalysis, 2018, 61(7-8), 610-615.

Jeon JY et al., "Synthesis of aromatic anion exchange membranes by Friedel-Crafts bromoalkylation and cross-linking of polystyrene block copolymers," Macromolecules, 2019, 52(5), 2139-2147.

Jia W et al., "Gas transport characteristics of fluorinated polystyrene-b-polybutadiene-b-polystyrene (F-SBS)," Journal of Membrane Science, 2019, 591, 117296 (24 pp.).

Jo TS et al., "Highly efficient incorporation of functional groups into aromatic main-chain polymer using iridium-catalyzed C—H activation and Suzuki—Miyaura reaction," Journal of the American Chemical Society 131, 2009,(5), 1656-1657.

Jo TS et al., "Synthesis of quaternary ammonium ion-grafted polyolefins via activation of inert C—H bonds and nitroxide mediated radical polymerization," Journal of Polymer Science Part A: Polymer Chemistry, 2009, 47(18), 4519-4531.

Jo TS et al., "Synthesis of sulfonated aromatic poly(ether amide) s and their application to proton exchange membrane fuel cells," Journal of Polymer Science Part A: Polymer Chemistry, 2009, 47(2), 485-496.

JP H06188005A: Online Translation of Abstract, Claims, and Detailed Description of retrieved from ESPACENET on Feb. 10, 2021 (20 pp.).

Kazakova, et al., "Trifluoromethanesulfonic Acid in Organic Synthesis," Russian Journal of Organic Chemistry, 2017, vol. 53, No. 4, pp. 485-509.

Kim E et al., "Nanoscale building blocks for the development of novel proton exchange membrane fuel cells," The Journal of Physical Chemistry B, 2008, 112(11), 3283-3286.

Kim JH et al., "Fabrication of dense cerium pyrophosphate-polystyrene composite for application as low-temperature proton-conducting electrolytes," Journal of The Electrochemical Society, 2015, 162(10), F1159-F1164.

Kim S et al., "A Novel Sulfonated Aromatic Polymer Membrane with Different Pendant Groups for Vanadium Redox Flow Batteries (VRFBs)," 2018 AIChE Annual Meeting, 2018, 103g (3 pp.).

Kim S et al., "Novel Sulfonated Aromatic Polymer Membranes for Breaking the Coulombic and Voltage Efficiency Trade-Off Limitation in Vanadium Redox Flow Battery," 236th ECS Meeting (Oct. 13-17, 2019), ECS Meeting Abstracts, 2019, MA2019-02, 565 (2 pp.).

Kim YS et al., "A New Class of Fuel Cells Based on Ion Pair-Coordinated Proton Exchange Membranes," 232nd ECS Meeting (Oct. 1-5, 2017), ECS Meeting Abstracts, 2017, MA2017-02, 1470 (2 pp.).

Kim YS et al., "HydroGEN Seedling: Scalable Elastomeric Membranes for Alkaline Water Electrolysis," in 2018 Annual Progress Report: DOE Hydrogen and Fuel Cells Program, U.S. Department of Energy, Document No. DOE/GO-102019-5156, Apr. 2019, accessible at https://www.hydrogen.energy.gov/pdfs/progress18/h2f_kim_2018.pdf (last accessed Dec. 15, 2020), 4 pp.

Kim YS et al., "Scalable Elastomeric Membranes for Alkaline Water Electrolysis," presented at the 2018 U.S. Department of Energy (DOE) Hydrogen and Fuel Cells Program Annual Merit Review and Peer Evaluation Meeting on Jun. 13-15, 2018 in Washington, D.C., accessible at https://www.hydrogen.energy.gov/pdfs/review18/pd159_kim_2018_p.pdf (last accessed Dec. 15, 2020), 23 pp.

Kim YS, "Advanced Materials for Fully-Integrated MEAs in AEMFCs," presented at the 2018 U.S. Department of Energy (DOE) Hydrogen and Fuel Cells Program and Vehicle Technologies Office Annual Merit Review and Peer Evaluation Meeting on Jun. 13-15, 2018 in Washington, DC, accessible at https://www.hydrogen.energy.gov/pdfs/review18/fc146_kim_2018_o.pdf(last accessed Dec. 15, 2020), 25 pp.

Kim YS, "Polymer-based fuel cells that operate from 80-220° C," presented at the 2018 U.S. Department of Energy (DOE) Hydrogen and Fuel Cells Program and Vehicle Technologies Office Annual Merit Review and Peer Evaluation Meeting on Jun. 13-15, 2018 in Washington, DC, accessible at https://www.hydrogen.energy.gov/pdfs/review18/fc175_kim_2018_o.pdf(last accessed Dec. 15, 2020), 24 pp.

Kim YS, "Scalable Elastomeric Membranes for Alkaline Water Electrolysis," presented at the 2019 U.S. Department of Energy (DOE) Hydrogen and Fuel Cells Program Annual Merit Review and Peer Evaluation Meeting on Apr. 29-May 1, 2019 in Crystal City, Virginia, accessible at https://www.hydrogen.energy.gov/pdfs/review19/p159_kim_2019_o.pdf (last accessed Dec. 15, 2020), 22 pp.

Kim YS, "Scalable Elastomeric Membranes for Alkaline Water Electrolysis," presented at the 2020 U.S. Department of Energy Hydrogen and Fuel Cells Program Annual Merit Review and Peer Evaluation Meeting on May 20, 2020, accessible at https://www.hydrogen.energy.gov/pdfs/review20/p159_kim_2020_p.pdf (last accessed Dec. 15, 2020), 29 pp.

Kimura, K.W., "Selective Electrochemical CO2 Reduction during Pulsed Potential Stems from Dynamic Interface," ACS Catalysis, University of Illinois at Urbana-Champaign, Published Jun. 24, 2020, 31 pages.

Ko K et al., "Effect of Temperature on Nanophase-segregation and Transport in Polysulfone-Based Anion Exchange Membrane Fuel Cell: Molecular Dynamics Simulation Approach," Bulletin of the American Physical Society, 2013, 58(1), H1.307 (1 p.).

Kraglund MR et al., "Ion-solvating membranes as a new approach towards high rate alkaline electrolyzers," Energy & Environmental Science, 2019, 12, 3313-3318.

Kraglund MR et al., Supplementary information for "Ion-solvating membranes as a new approach towards high rate alkaline electrolyzers," Energy & Environmental Science, 2019, 12, 3313-3318 (19 pp.).

(56) References Cited

OTHER PUBLICATIONS

Kreuer KD, "On the development of proton conducting polymer membranes for hydrogen and methanol fuel cells," Journal of Membrane Science, 2001, 185, 29-39.

Le TP et al., "Miscibility and acid strength govern contact doping of organic photovoltaics with strong polyelectrolytes," Macromolecules, 2015, 48(15), 5162-5171.

Lee WH et al., "Fluorene-based hydroxide ion conducting polymers for chemically stable anion exchange membrane fuel cell," ACS Macro Letters, 2015, 4(4), 453-457.

Lee WH et al., "Molecular Engineering of Aromatic Polymer Electrolytes for Anion Exchange Membranes," ECS Transactions, 2017, 80(8), 941-944.

Lee WH et al., "Molecular Engineering of Ion-Conducting Polymers for Fuel Cell Membrane Applications," ECS Transactions, 2015, 69(17), 357-361.

Lee WH et al., "Poly (terphenylene) anion exchange membranes: the effect of backbone structure on morphology and membrane property," ACS Macro Letters, 2017, 6(5), 566-570.

Lee YB et al., "Effect of Ammonium Ion Structures on Properties of Alkaline Exchange Membrane Fuel Cells," ECS Transactions, 2010, 33(1), 1889-1892.

Lee YB et al., "Novel Synthetic Approach and their Properties for Alkaline Exchange Polysulfone Membranes," 2011 ECS Meeting Abstracts, MA2011-02, 866 (2 pp.).

Lee WH et al. "Robust Hydroxide Ion Conducting Poly(biphenyl)s for Alkaline Fuel Cell Membranes," ACS Macro Letters, 2015, 4(8), 814-818.

Lee WH et al., Supporting Information for "Robust Hydroxide Ion Conducting Poly(biphenyl)s for Alkaline Fuel Cell Membranes," ACS Macro Letters, 2015, 4(8), 814-818 (pp. 1-16).

Leng Y et al., "Solid-State Water Electrolysis with an Alkaline Membrane," Journal of the American Chemical Society, 2012, 134, 9054-9057.

Leng Y et al., Supporting Information for "Solid-State Water Electrolysis with an Alkaline Membrane," Journal of the American Chemical Society, 2012, 134, 9054-9057 (13 pp.).

Leonard DP et al., "Asymmetric electrode ionomer for low relative humidity operation of anion exchange membrane fuel cells," Journal of Materials Chemistry A, 2020, 8(28), 14135-14144.

Luo X et al., "Mesoscale Simulations of Quaternary Ammonium-Tethered Triblock Copolymers: Effects of the Degree of Functionalization and Styrene Content," Journal of Physical Chemistry C, 2020, 124(30), 16315-16323.

Matanovic I et al., "Adsorption of polyaromatic backbone impacts the performance of anion exchange membrane fuel cells," Chemistry of Materials, 2019, 31(11), 4195-4204.

Maurya S et al., "On the origin of permanent performance loss of anion exchange membrane fuel cells: Electrochemical oxidation of phenyl group," Journal of Power Sources, 2019, 436, 226866.

Maurya S et al., "Polyaromatic Ionomers for High Performance Alkaline Membrane Fuel Cells," ECS Meeting Abstracts, 2019, MA2019-02, 1572 (3 pp.).

Maurya S et al., "Rational design of polyaromatic ionomers for alkaline membrane fuel cells with> 1 W cm-2 power density," Energy & Environmental Science, 2018, 11(11), 3283-3291.

Maurya S et al., "Surface adsorption affects the performance of alkaline anion-exchange membrane fuel cells," ACS Catalysis, 2018, 8(10), 9429-9439.

Meek KM et al., "High-Throughput Anion Exchange Membrane Characterization at NREL," ECS Transactions, 2019, 92(8), 723-731.

Mittelsteadt C et al., "Dimensionally Stable High Performance Membranes," presented at the 2016 U.S. Department of Energy (DOE) Hydrogen and Fuel Cells Program and Vehicle Technologies Office Annual Merit Review and Peer Evaluation Meeting on Jun. 6-10, 2019 in Washington, D.C., accessible at https://www.hydrogen.energy.gov/pdfs/review16/fc150_mittelsteadt_2016_p.pdf (last accessed Dec. 15, 2020), 19 pp.

Mochizuki T et al., "Simple, Effective Molecular Strategy for the Design of Fuel Cell Membranes: Combination of Perfluoroalkyl and Sulfonated Phenylene Groups," ACS Energy Letters, 2016, 1(2), 348-352 (Abstract and Supporting Information only, 11 pp.).

Mohanty AD et al., "Mechanistic analysis of ammonium cation stability for alkaline exchange membrane fuel cells," Journal of Materials Chemistry A, 2014, 2(41), 17314-17320.

Mohanty AD et al., "Stable Elastomeric Anion Exchange Membranes Based on Quaternary Ammonium-Tethered Polystyrene-b-poly(ethylene-co-butylene)-b-polystyrene Triblock Copolymers," Macromolecules, 2015,48(19), 7085-7095.

Mohanty AD et al., "Systematic alkaline stability study of polymer backbones for anion exchange membrane applications," Macromolecules, 2016, 49(9), 3361-3372.

Mohanty AD et al., "Systematic Analysis of Cation Stability in Alkaline Exchange Membrane Fuel Cells," ECS Transactions, 2014, 64(3), 1221-1228.

Mohanty AD et al., "Thermochemical stability study of alkyl-tethered quaternary ammonium cations for anion exchange membrane fuel cells," Journal of the Electrochemical Society, 2017, 164(13), F1279-F1285.

Mohanty AD et al., "Transition Metal-Catalyzed Functionalization of Polyolefins Containing C—C, C=C, and C—H Bonds," Advances in Organometallic Chemistry, 2015, 64, 1-39.

Mohanty AD et al., "Anion Exchange Fuel Cell Membranes Prepared from C—H Borylation and Suzuki Coupling Reactions," Macromolecules, 2014, 47, 1973-1980.

Noh S et al., "Molecular engineering of hydroxide conducting polymers for anion exchange membranes in electrochemical energy conversion technology," Accounts of Chemical Research, 2019, 52(9), 2745-2755.

Norsten TB et al., "Highly fluorinated comb-shaped copolymers as proton exchange membranes (PEMs): improving PEM properties through rational design," Advanced Functional Materials, 2006, 16, 1814-1822.

Pagels M et al., "Synthetic Approach to Hydrocarbon Proton Exchange Membranes Using Anion Exchange Membrane Precursors," ECS Meeting Abstracts, 2020, MA2020-02, 2237 with Presentation (19 pp.).

Pagels MK et al., "One-Pot Synthesis of Proton Exchange Membranes from Anion Exchange Membrane Precursors," ACS Macro Letters, 2020, 9(10), 1489-1493.

Pagels MK et al., "Synthesis of anion conducting polymer electrolyte membranes by Pd-Catalyzed Buchwald-Hartwig Amination coupling reaction," Tetrahedron, 2019, 75(31), 4150-4155.

Pagels MK et al., Supporting Information for "One-Pot Synthesis of Proton Exchange Membranes from Anion Exchange Membrane Precursors," ACS Macro Letters, 2020, 9(10), 1489-1493 (14 pp.).

Park EJ et al., "Dimethyl Substituted Polyaromatic Alkaline Ionomers for Better Alkaline Hydrogen Oxidation," ECS Meeting Abstracts, 2018, MA2018091, 1753 (3 pp.).

Park EJ et al., "How does a small structural change of anode ionomer make a big difference in alkaline membrane fuel cell performance?," Journal of Materials Chemistry A, 2019, 7(43), 25040-25046.

Park EJ et al., "Superacidic porous polymer catalyst and its application in esterification of carboxylic acid," Structural Chemistry, 2017, 28(2), 493-500.

Park EJ et al., "Versatile functionalization of aromatic polysulfones viathiol-ene click chemistry," Journal of Polymer Science Part A: Polymer Chemistry, 2016, 54(19), 3237-3243.

Park EJ, "Chemically durable polymer electrolytes for solid-state alkaline water electrolysis," Journal of Power Sources, 2018, 375, 367-372.

Park IS et al., "Sulfonated Polyamide Based IPMCs," Proceedings of SPIE, Electroactive Polymer Actuators and Devices (EAPAD) 2009, 7287, 72870X.

Park J et al., "A comparison study of ionic polymer-metal composites (IPMCs) fabricated with Nafion and other ion exchange membranes," Proceedings of SPIE, Electroactive Polymer Actuators and Devices (EAPAD) 2013, 8687, 868714.

(56) References Cited

OTHER PUBLICATIONS

Park J et al., "Electromechanical performance and other characteristics of IPMCs fabricated with various commercially available ion exchange membranes," Smart materials and structures, 2014, 23(7), 074001.

Parrondo J et al., "Synthesis and Alkaline Stability of Solubilized Anion Exchange Membrane Binders Based on Poly(phenylene oxide) Functionalized with Quaternary Ammonium Groups via a Hexyl Spacer," Journal of The Electrochemical Society, 2015, 162, F1236-F1242.

Pena, E.R., et al., "Factors Enhancing the Reactivity of Carbonyl Compounds for Polycondensations with Aromatic Hydrocarbons. A Computational Study," Macromlecules, 2004, 37(16), 6227-6235.

Perret R et al., "IV.F.4 Hydrogen Fuel Cells and Storage Technology Project," in 2008 Annual Progress Report: DOE Hydrogen Program, U.S. Department of Energy, accessible at https://www.hydrogen.energy.gov/pdfs/progress08/iv_f_4_perret.pdf (last accessed Dec. 15, 2020), pp. 776-786.

Perret R et al., "IV.G.1 Hydrogen Fuel Cells and Storage Technology Project (FCAST)," in 2007 Annual Progress Report: DOE Hydrogen Program, U.S. Department of Energy, accessible at https://www.hydrogen.energy.gov/pdfs/progress07/iv_g_1_perret.pdf (last accessed Dec. 15, 2020), pp. 638-647.

Perret R et al., "IV.G.4 Fundamental Research for Optimization of Hydrogen Storage and Utilization," in 2006 Annual Progress Report: DOE Hydrogen Program, U.S. Department of Energy, accessible at https://www.hydrogen.energy.gov/pdfs/progress06/iv_g_4_perret.pdf (last accessed Dec. 15, 2020), pp. 575-581.

Perret R et al., "IV.H.5 Hydrogen Fuel Cells and Storage Technology Project," in 2009 Annual Progress Report: DOE Hydrogen Program, U.S. Department of Energy, accessible at https://www.hydrogen.energy.gov/pdfs/progress09/iv_h 5_perret.pdf (last accessed Dec. 15, 2020), pp. 801-807.

Powers W et al., "Borylation of Polystyrene: Random Blocky vs. Truly Random Copolymers," Bulletin of the American Physical Society, 2009, 54(1), C1.089 (1 p.).

Sepehr F et al., "Mesoscale Simulations of Anion Exchange Membranes Based on Quaternary Ammonium Tethered Triblock Copolymers," Macromolecules, 2017, 50, 4397-4405.

Shin D et al., "Ch. 8: Anion Exchange Membranes: Stability and Synthetic Approach," in The Chemistry of Membranes Used in Fuel Cells: Degradation and Stabilization, S. Schlick (eds.), Wiley, 2018, pp. 195-228.

Shin J et al., "A new homogeneous polymer support based on syndiotactic polystyrene and its application in palladium-catalyzed Suzuki-Miyaura cross-coupling reactions," Green Chemistry, 2009, 11(10), 1576-1580.

Shin J et al., "Borylation of Polystyrene," Synfacts 2008 (2), 145.

Shin J et al., "Controlled Functionalization of Crystalline Polystyrenes via Activation of Aromatic C—H Bonds," Macromolecules, 2007, 40(24), 8600-8608.

Shin J et al., "Hydrophilic functionalization of syndiotactic polystyrene via a combination of electrophilic bromination and Suzuki-Miyaura reaction," Journal of Polymer Science Part A: Polymer Chemistry, 2010, 48(19), 4335-4343.

Shin J et al., "Hydrophilic graft modification of a commercial crystalline polyolefin," Journal of Polymer Science Part A: Polymer Chemistry. 2008,46(11), 3533-3545.

Sivakami JN et al., "'Kick-started' oxetanes in photoinitiated cationic polymerization: scale-up synthesis and structure-property studies," Proceedings of RadTech International UV & EB Technology Expo & Conference (held on May 15-18, 2016 in Chicago, IL), 2016, 5 pp.

Smedley SB et al., "Measuring water hydrogen bonding distributions in proton exchange membranes using linear Fourier Transform Infrared spectroscopy," Solid State Ionics, 2015, 275, 66-70.

Smedley SB et al., "Spectroscopic Characterization of Sulfonate Charge Density in Ion-Containing Polymers," The Journal of Physical Chemistiy B, 2017, 121(51), 11504-11510.

Tian D et al., "Phosphoric Acid-Doped Biphenyl-Backbone Ion-Pair Coordinated Pems with Broad Relative Humidity Tolerance," ECS Meeting Abstracts, 2020, MA2020-02, 2240 (2 pp.).

Tian D et al., "Phosphoric Acid-Doped Ion-Pair Coordinated PEMs with Broad Relative Humidity Tolerance," Energies, 2020, 13(8), 1924 (14 pp.).

Tian D et al., "Structure and gas transport characteristics of triethylene oxide-grafted polystyrene-b-poly(ethylene-co-butylene)-b-polystyrene," Journal of Polymer Science 2020, 58(18), 2654-2663.

Trant C et al., "Impact of Microstructured Morphology on Macroscale Properties of Semi-Crystalline Triblock Copolymer Anion Exchange Membranes," ECS Meeting Abstracts, 2020, MA2020-01, 2267 (2 pp.).

Trant C et al., "Synthesis and Characterization of Anion-Exchange Membranes Using Semicrystalline Triblock Copolymers in Ordered and Disordered States," Macromolecules 2020, 53(19), 8548-8561.

Velasco VM et al., "Novel Aromatic Polymers with Pentafluorophenyl Pendant Groups," Macromolecules, 2008, 41, 8504-8512.

Walgama R et al., "The Effect of Backbone Structure on Functional Properties in Anion Exchange Membranes; Comparison of Poly (fluorene) with Poly (biphenylene) and Poly (terphenylene)s," ECS Meeting Abstracts, 2020, MA2020-02, 2268 (3 pp.).

Wang J et al., "Poly(aryl piperidinium) membranes and ionomers for hydroxide exchange membrane fuel cells," Nature Energy, 2019, 4, 392-398.

Wang J et al., Supplementary Information for "Poly(aryl piperidinium) membranes and ionomers for hydroxide exchange membrane fuel cells," Nature Energy, 2019, 4, 392-398 (13 pp.).

Wang T et al., "Poly (terphenylene) anion exchange membranes with high conductivity and low vanadium permeability for vanadium redox flow batteries (VRFBs)," Journal of Membrane Science, 2020, 598, 117665.

Wang T et al., "Suppressing vanadium crossover using sulfonated aromatic ion exchange membranes for high performance flow batteries," Materials Advances, 2020 1(7), 2206-2218.

Wang T et al., Supplementary Information for "Suppressing vanadium crossover using sulfonated aromatic ion exchange membranes for high performance flow batteries," Materials Advances, 2020, 1(7), 2206-2218 (15 pp.).

Week PF et al., "Nanoscale building blocks for the development of novel proton-exchange membranes fuel cells: A first-principles study," Bulletin of the American Physical Society, 2008, 53(2), C1.095 (1 p.).

Wi SN et al., "Study of Water Dynamics in Superacidic Hydrocarbon Proton Exchange Membranes Using Solid-State and Pulsed-Field Gradient NMR Spectroscopy," National High Magnetic Field Laboratory 2015 Annual Research Report, 2015 (1 p.).

Xu H, "Novel Fluorinated Ionomer for PEM Fuel Cells," presented at the 2018 U.S. Department of Energy (DOE) Hydrogen and Fuel Cells Program and Vehicle Technologies Office Annual Merit Review and Peer Evaluation Meeting on Jun. 13-15, 2018 in Washington, DC, accessible at https://www.hydrogen.energy.gov/pdfs/review18/fc185 _xu_2018_p.pdf (last accessed Dec. 15, 2020), 15 pp.

Xu, Y., "Self-Cleaning CO2 Reduction Systems: Unsteady Electrochemical Forcing Enables Stability," ACS Energy Lett., 2021, 6, 809-815.

Yang ZT et al., "Photoinitiated cationic polymerization of sustainable epoxy and oxetane thermosets," Proceedings of RadTech International UV & EB Technology Expo & Conference (held on May 15-18, 2016 in Chicago, IL), 2016, 5 pp.

Yim W et al., "Development of Ultrafiltration Membrane-Separation Technology for Energy-Efficient Water Treatment and Desalination Process," Final Report for DOE Award No. DE-SC0005062, 2016, 18 pp.

Yin Z et al., "An alkaline polymer electrolyte CO2 electrolyzer operated with pure water," Energy & Environmental Science, 2019, 12, 2455-2462.

Yin Z et al., Supporting Information for "An alkaline polymer electrolyte CO2 electrolyzer operated with pure water," Energy & Environmental Science, 2019, 12, 2455-2462 (7 pp.).

Yokota et al., "Anion Conductive Aromatic Block Copolymers Continuing Diphenyl Ether or Sulfide Groups for Application to Alkaline Fuel Cells," vol. 6, No. 19, Oct. 8, 2014, pp. 17044-17052.

(56) References Cited

OTHER PUBLICATIONS

Yoshimura K et al., "Aromatic Polymer with Pendant Perfluoroalkyl Sulfonic Acid for Fuel Cell Applications," Macromolecules, 2009, 42(23), 9302-9306 (Abstract and Supporting Information only, 8 pp.).
Zelovich T et al., "Ab initio molecular dynamics study of hydroxide diffusion mechanisms in nanoconfined structural mimics of anion exchange membranes," The Journal of Physical ChemisLiy C, 2019, 123(8), 4638-4653.
Zelovich T et al., "Anion Exchange Membranes with Low Hydration Conditions from an Ab Initio Molecular Dynamics Perspective," ECS Meeting Abstracts, 2019, MA2019-01, 1957 (2 pp.).
Zelovich T et al., "Hydroxide ion diffusion in anion-exchange membranes at low hydration: insights from ab initio molecular dynamics," Chemistiy of Materials, 2019 31(15), 5778-5787.
Zeng QH et al., "Anion exchange membranes based on quatemized polystyrene-block-poly (ethylene-ran-butylene)-block-polystyrene for direct methanol alkaline fuel cells," Journal of Membrane Science, 2010, 349(1-2), 237-243.
Zhu L et al., "Effects of tertiary amines and quaternary ammonium halides in polysulfone on membrane gas separation properties," Journal of Polymer Science Part B: Polymer Physics, 2018, 56(18), 1239-1250.
U.S. Appl. No. 17/309,401, filed May 25, 2021, Bae et al.
U.S. Office Action dated Oct. 14, 2021, issued in U.S Appl. No. 16/842,037.
U.S. Notice of Allowance dated Nov. 22, 2021, issued in U.S. Appl. No. 16/553,965.

\* cited by examiner

POLYMERS AND METHODS FOR THEIR MANUFACTURE

CROSS REFERENCE TO RELATED APPLICATION

This application is a continuation-in-part of U.S. Non-Provisional patent application Ser. No. 16/553,965, filed Aug. 28, 2019, which is a divisional patent application of U.S. Non-Provisional patent application Ser. No. 15/527,967, filed May 18, 2017, which is a national stage patent application filing of International Patent Application No. PCT/US2015/061036, filed Nov. 17, 2015, which claims the benefit of U.S. Provisional Patent Application Ser. No. 62/081,144, filed Nov. 18, 2014. This application also claims the benefit of U.S. Provisional Patent Application Ser. No. 62/804,634, filed Feb. 12, 2019. Each of these applications are incorporated herein by reference in their entirety, including any figures, tables, and drawings.

STATEMENT REGARDING FEDERALLY SPONSORED RESEARCH OR DEVELOPMENT

This invention was made with government support under the Department of Energy, Grant No. DE-AR0000769. The government has certain rights in the invention.

BACKGROUND

Alkaline exchange membranes or anion exchange membranes (AEMs) allow for the transportation of anions (e.g., OH⁻, Cl⁻, Br⁻) from the cathode to the anode in an electrochemical reaction. AEMs are a critical component of AEM fuel cells, where hydrogen and oxygen are used to generate electricity, with water as a byproduct. AEMs are also used in water electrolysis, where water is split into hydrogen and oxygen using electricity. In both AEM fuel cells and water electrolysis, hydroxide ions (OH) are transported through the AEM, along with water molecules. AEMs may also be used, for example, in batteries, sensors, and as actuators.

Known AEMs are generally unsuitable for use in AEM fuel cells or water electrolysis. Many commercially-available AEMs are based on polystyrene, which is generally considered a poor choice for AEM fuel cells or water electrolysis.

Other AEM materials include polysulfones, poly(phenylene oxide)s, poly(phenylene)s, poly(benzimidazolium)s, poly(arylene ether ketone)s, and poly(arylene ether sulfone)s. These polymers contain an arylene ether linkage (—O—) in the mid-chain and a benzyltrimethyl ammonium group in the side-chain. This combination, however, has been found to be chemically unstable and to degrade easily under highly alkaline conditions. Known polyarylenes, in particular, will contain ether linkages in the polymer backbone because they are typically synthesized by basic condensation reactions between diol monomers and dihalide monomers, which produces hydrogen chloride as a byproduct.

In addition, the chloromethylation reaction involved in the manufacture of these polymers requires the use of toxic reagents, long reaction times, and extensive optimization to reach a desired degree of functionalization. Side reactions (e.g., gelation) frequently occur over prolonged reaction times, making it difficult to achieve an ion-exchange capacity (IEC) above 2.5 mequiv/g.

BRIEF DESCRIPTION OF THE INVENTION

In one embodiment, the invention provides a method of forming a polymer, the method comprising: reacting an aromatic compound and a trifluoroalkyl ketone in the presence of a strong acid to form a bromoalkylated precursor polymer; and reacting the bromoalkylated precursor polymer with a trialkylamine and sodium hydroxide to form a polyarylene having a main chain free of ether linkages.

In another embodiment, the invention provides a polymer according to formula I (formula I), wherein Ar is an aromatic compound, r is from 100 to 1,000,000, $R^2$ is

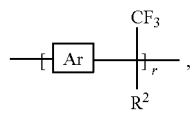

R is an alkyl group, and n is from 1 to 20.

In still another embodiment, the invention provides polymer according to formula III (formula III)

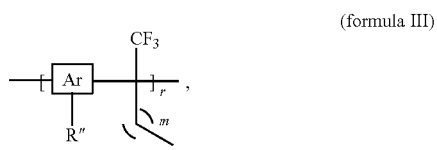

wherein Ar is an aromatic compound, R" is

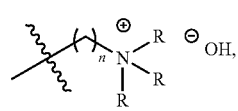

r is from 100 to 1,000,000, and m is from 0 to 20.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
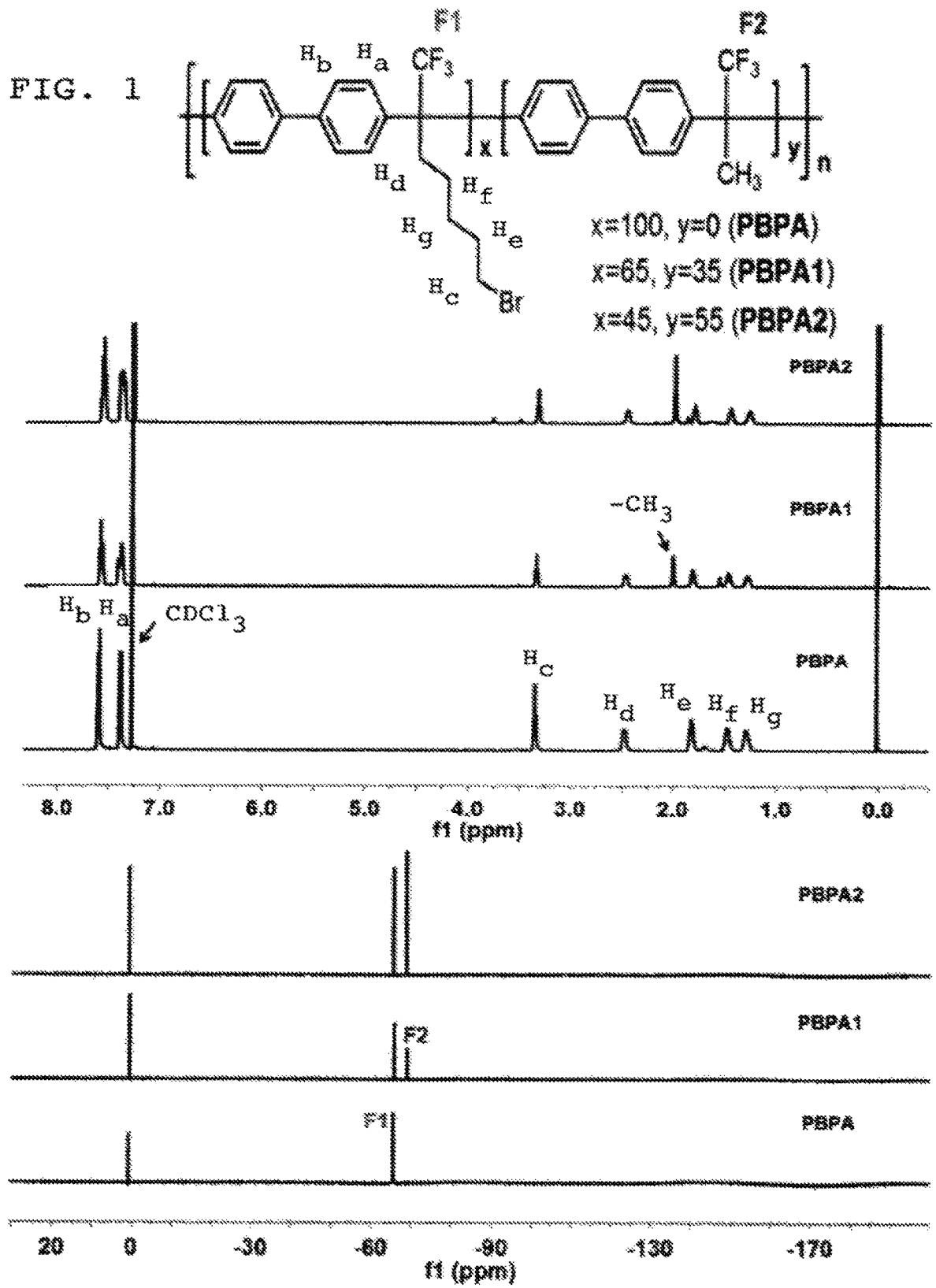
FIG. 1 shows ¹H and ¹⁹F NMR spectra of three illustrative bromoalkylated precursor polymers according to embodiments of the invention.

It is noted that the drawings of the invention are not to scale. The drawings are intended to depict only typical aspects of the invention, and therefore should not be considered as limiting the scope of the invention.

DETAILED DESCRIPTION

Some embodiments of the invention relate to a novel class of quaternized ammonium hydroxide-containing polyarylene polymers and methods for their manufacture. Applicants have, for the first time, manufactured high molecular weight, quaternary ammonium-tethered polyarylenes (including poly(biphenyl alkylene)s) without alkaline labile C—O bonds using acid-catalyzed polycondensation reactions.

In addition to their use in AEMs in the fuel cell and water electrolysis contexts noted above, Applicants have also found polymers of the invention to be useful in metal-air battery technologies. Surprisingly, Applicants have also found that these polymers exhibit antimicrobial activity, making them potentially useful as antimicrobial coatings for any number of products.

As will be explained in greater detail below, the polymers of the invention are synthesized by acidic condensation between ketone and aromatic compounds. As a result, the byproduct is water, rather than hydrogen chloride, as in known polyarylene synthesis methods.

Applicants have developed a novel method of polymer manufacture, generally comprising: reacting an aromatic compound and a trifluoroalkyl ketone in the presence of a strong acid (acid-catalyzed Friedel-Crafts polycondensation) to form a bromoalkylated precursor polymer; and reacting the bromoalkylated precursor polymer with a trialkylamine in the presence of sodium hydroxide to form a polyarylene having a main chain free of ether linkages.

According to some embodiments of the invention, the aromatic compound is selected from a group consisting of:

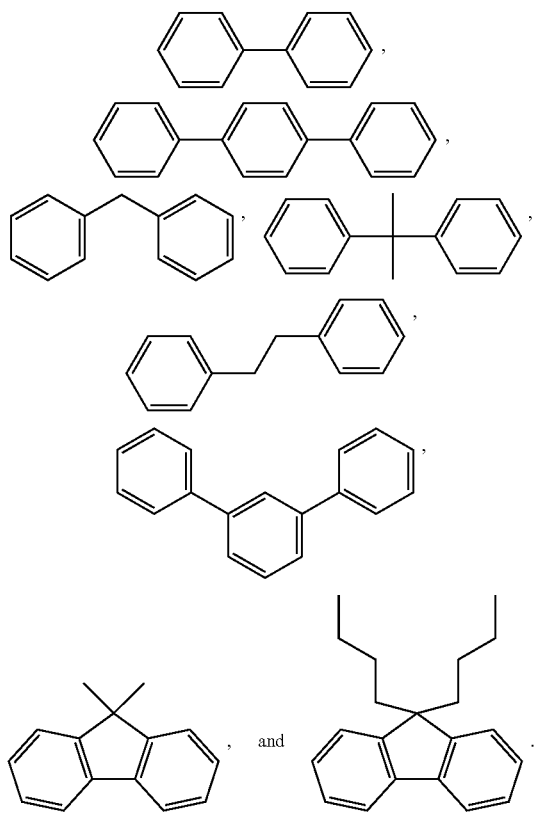

According to other embodiments of the invention, the aromatic compound is selected from a group consisting of:

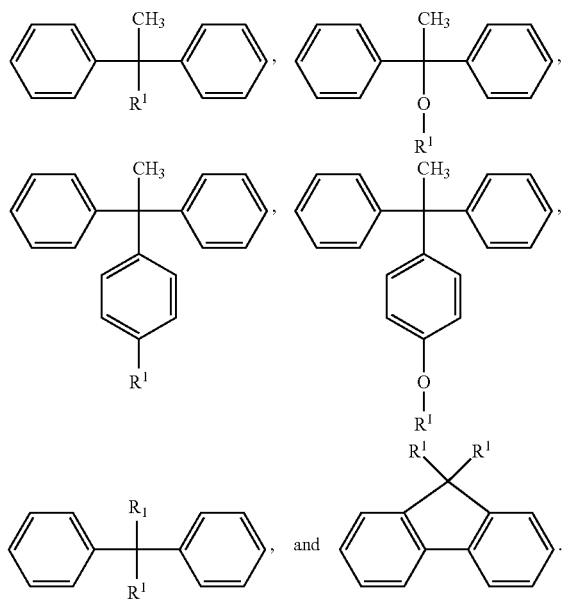

In some particular embodiments of the invention, the aromatic compound is biphenyl.

According to some embodiments of the invention, the trifluoroalkyl ketone is selected from a group consisting of: 7-bromo-1,1,1-trifluoroheptan-2-one and methyl trifluoromethyl ketone.

According to some embodiments of the invention, a polymer is manufactured according to Reaction 1 below, where Ar is a polyarylene, r is from 100 to 1,000,000, R1 is

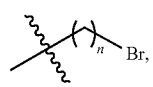

R2 is

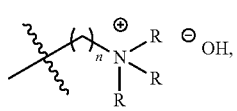

R is an alkyl group, and n is from 1 to 20.

(Reaction 1)

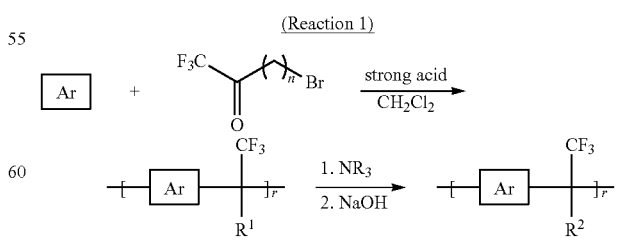

Strong acids suitable for use in Reaction 1 include trifluoromethane sulfonic acid, although other suitable acids will be apparent to one of ordinary skill in the art.

In other embodiments of the invention, an aromatic group may be combined with multiple trifluoroalkyl ketones, as in Reaction 1A below, where Ar is an aromatic compound, r is from 100 to 1,000,000, R1 is

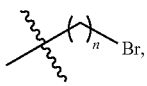

R2 is

R is an alkyl group, and n is from 1 to 20.

(Reaction 1A)

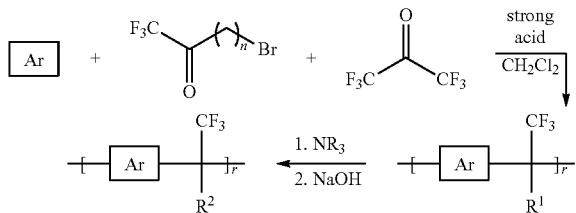

The manufacture of three exemplary poly(biphenyl alkylene) s according to embodiments of the invention is described below. These poly(biphenyl alkylene)s have general formula 1A (formula 1A)

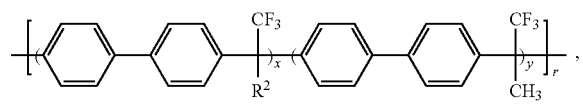

where $R^2$ is , x+y=1 , and r is from 100 to 1,000,000. In a first poly(biphenyl alkylene), referred to as PBPA+, x is 1 and y is 0. In a second poly(biphenyl alkylene), referred to as PBPA1+, x is 0.65 and y is 0.35. In a third poly(biphenyl alkylene), referred to as PBPA2+, x is 0.44 and y is 0.56.

Example 1—PBPA+

Biphenyl (0.70 g, 4.53 mmol), 7-bromo-1, 1, 1-trifluoroheptan-2-one (1.12 g, 4.53 mmol), methylene chloride (3.0 mL), and trifluoromethanesulfonic acid (TFSA) were mixed under nitrogen at room temperature using a magnetic stirring bar. After 10 hours, the reaction mixture solution became highly viscous and was stirred for an additional two hours. The resulting dark brown, gel-like mass was then shredded with sonication and poured slowly into methanol, forming a white fiber, which was then filtered and washed with hot methanol. After vacuum drying, 1.70 g (97% yield) of a white fiber-like solid, a bromoalkylated precursor polymer referred to herein as PBPA, was obtained. FIG. 1 shows $^1$H and $^{19}$F NMR spectra of three bromoalkylated poly(biphenyl alkylene) precursors, including PBPA.

Figure 2:
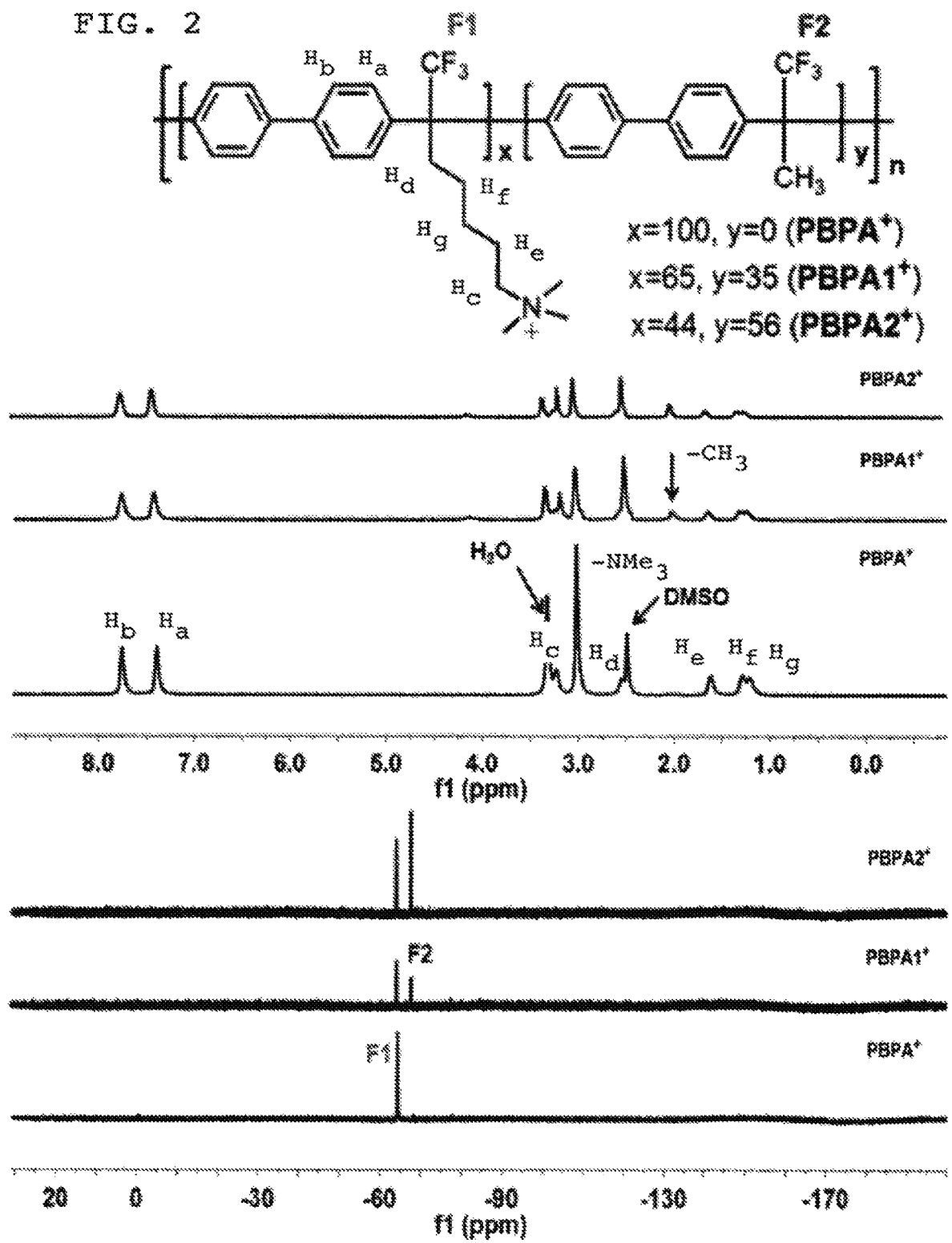
FIG. 2 shows ¹H and ¹⁹F NMR spectra of three illustrative polyarylenes according to embodiments of the invention.

PBPA (200 mg) was dissolved in tetrahydrofuran (THF; 2 mL) and aqueous trimethylamine (1 mL) added to the solution, which was stirred at room temperature. The solubility of the polymer gradually decreased and the ionic polymer was precipitated after six hours. Deionized water (1 mL) was added to the solution to dissolve the precipitate. Addition of THF, stirring at RT for six hours, and dissolution with deionized water was repeated. Volatile solvent was then evaporated using a rotary evaporator and the residue redissolved with a small amount of methanol (approximately 2 mL). The ionic polymer was precipitated by adding ether, filtered, and dried under vacuum, resulting in a 97% yield (227 mg) of the poly(biphenyl alkylene) PBPA+. FIG. 2 shows $^1$H and $^{19}$F NMR spectra of three poly(biphenyl alkylene)s, including PBPA+.

Example 2—PBPA1+

Biphenyl (0.70 g, 4.53 mmol), 7-bromo-1, 1, 1-trifluoroheptan-2-one (0.73 g, 2.95 mmol), methyl trifluoromethyl ketone (0.18 g, 1.60 mmol), methylene chloride (3.0 mL), and TFSA (2.0 mL) were stirred under nitrogen at RT using a magnetic stirring bar. After five hours, the reaction mixture solution became highly viscous and was stirred for an additional two hours. The resulting dark brown, gel-like mass was then shredded with sonication and poured slowly into methanol. A white fiber formed and was filtered and washed with hot methanol. After drying under vacuum, 1.4 g (96% yield) solid, a bromoalkylated precursor polymer referred to herein as PBPA1 , was obtained. FIG. 1 shows $^1$H and $^{19}$F NMR spectra of three bromoalkylated poly(biphenyl alkylene) precursors, including PBPA1 .

PBPA1 (200 mg) was dissolved in tetrahydrofuran (THF; 2 mL) and aqueous trimethylamine (1 mL) added to the solution, which was stirred at room temperature. The solubility of the polymer gradually decreased and the ionic polymer was precipitated after six hours. Deionized water (1 mL) was added to the solution to dissolve the precipitate. Addition of THF, stirring at RT for six hours, and dissolution with deionized water was repeated. Volatile solvent was then evaporated using a rotary evaporator and the residue redissolved with a small amount of methanol (approximately 2 mL) . The ionic polymer was precipitated by adding ether, filtered, and dried under vacuum, resulting in a 98% yield (219 mg) of the poly(biphenyl alkylene) PBPA1+. FIG. 2 shows $^1$H and $^{19}$F NMR spectra of three poly(biphenyl alkylene)s, including PBPA1+.

Example 3—PBPA2+

Biphenyl (0.50 g, 3.24 mmol), 7-bromo-1, 1, 1-trifluoroheptan-2-one (0.40 g, 1.62 mmol), methyl trifluoromethyl ketone (0.19 g, 1.69 mmol), methylene chloride (2.5 mL), and TFSA (2.3 mL) were stirred under nitrogen at RT using a magnetic stirring bar. After three hours, the reaction mixture solution became highly viscous and was stirred an additional two hours. The resulting dark brown, gel-like mass was then shredded with sonication and poured slowly into methanol. A white fiber formed and was filtered and washed with hot methanol. After drying under vacuum, 0.94 g of a white fiber-like solid, a bromoalkylated precursor polymer referred to herein as PBPA2, was obtained. FIG. 1 shows $^1$H and $^{19}$F NMR spectra of three bromoalkylated poly(biphenyl alkylene) precursors, including PBPA2.

PBPA2 (200 mg) was dissolved in tetrahydrofuran (THF; 2 mL) and aqueous trimethylamine (1mL) added to the solution, which was stirred at room temperature. The solubility of the polymer gradually decreased and the ionic polymer was precipitated after six hours. Deionized water (1 mL) was added to the solution to dissolve the precipitate. Addition of THF, stirring at RT for six hours, and dissolution with deionized water was repeated. Volatile solvent was then evaporated using a rotary evaporator and the residue redissolved with a small amount of methanol (approximately 2 mL). The ionic polymer was precipitated by adding ether, filtered, and dried under vacuum, resulting in a 98% yield (210 mg) of the poly(biphenyl alkylene) PBPA2+. FIG. 2 shows $^1$H and $^{19}$F NMR spectra of three poly(biphenyl alkylene)s, including PBPA2+.

Table 1 below shows water uptake (WU) and anion conductivity data for the PBPA+, PBPA1+, and PBPA2+ polymers.

| | WU (%) | | Cl (mS/cm) | | | OH(mS/cm) | | |
|---|---|---|---|---|---|---|---|---|
| Ionic polymer | 30° C. | 80° C. | 30° C. | 60° C. | 80° C. | 30° C. | 60° C. | 80° C. |
| PBPA$^+$ | 130 | 145 | 23 | 49 | 68/65$^a$ | 62 | 94 | 122/124$^a$ |
| PBPA1$^+$ | 102 | 110 | 14 | 28 | 47/50$^a$ | 41 | 58 | 88/92$^a$ |
| PBPA2$^+$ | 70 | 76 | 7 | 14 | 24/22$^a$ | 15 | 23 | 35/35$^a$ |

$^a$After immersion to 1 M NaOH solution for 30 days.

All three polymers exhibited excellent WU and conductivity properties, particularly PBPA+. Despite these WU values, all three polymers exhibited low swelling ratios (40% for PBPA+, 10% for PBPA1+, and 5% for PBPA2+), likely due to the presence of a rigid aromatic backbone.

Table 2 below shows ion-exchange capacity (IEC) data in mequiv/g for the PBPA+, PBPA1+, and PBPA2+ polymers before and after alkaline stability testing.

| | before | | After 80° C., 7 day | | After 80° C., 30 day | |
|---|---|---|---|---|---|---|
| Sample | $^1$H NMR | titration | $^1$H NMR | titration | $^1$H NMR | titration |
| PBPA$^+$ | 2.61 | 2.70 (± 0.1) | 2.61 | 2.74 (± 0.1) | 2.60 | 2.65 (± 0.03) |
| PBPA1$^+$ | 1.91 | 1.94 (± 0.04) | 1.89 | 1.94 (± 0.03) | 1.93 | 1.92 (± 0.03) |
| PBPA2$^+$ | 1.45 | 1.46 (± 0.01) | 1.49 | 1.47 (± 0.03) | 1.46 | 1.48 (± 0.01) |

As can be seen from the data in Table 2, all three poly(biphenyl alkylene)s exhibited remarkable IEC stability in an alkaline environment (1M NaOH), even after an extended period. As should also be apparent from the results in Table 2 and the examples above, the IEC of the polymers may be controlled by adjusting the relative proportions of different trifluoroalkyl ketones.

Interestingly, PBPA1+ afforded significantly higher hydroxide ion conductivity than other reported aromatic AEMs with similar IECs (e.g., quaternized poly(phenylene oxide)s, poly(arylene ether ketone)s, and poly(arylene ether sulfone)s). This is likely attributable to the relatively higher WU of PBPA1+, which helps the hydrated membrane diffuse hydroxide ions more effectively. All three polymers exhibit increased hydroxide ion conductivity with increasing temperature, primarily due to the faster migration of ions and higher diffusivity with increasing temperature.

Figure 3:
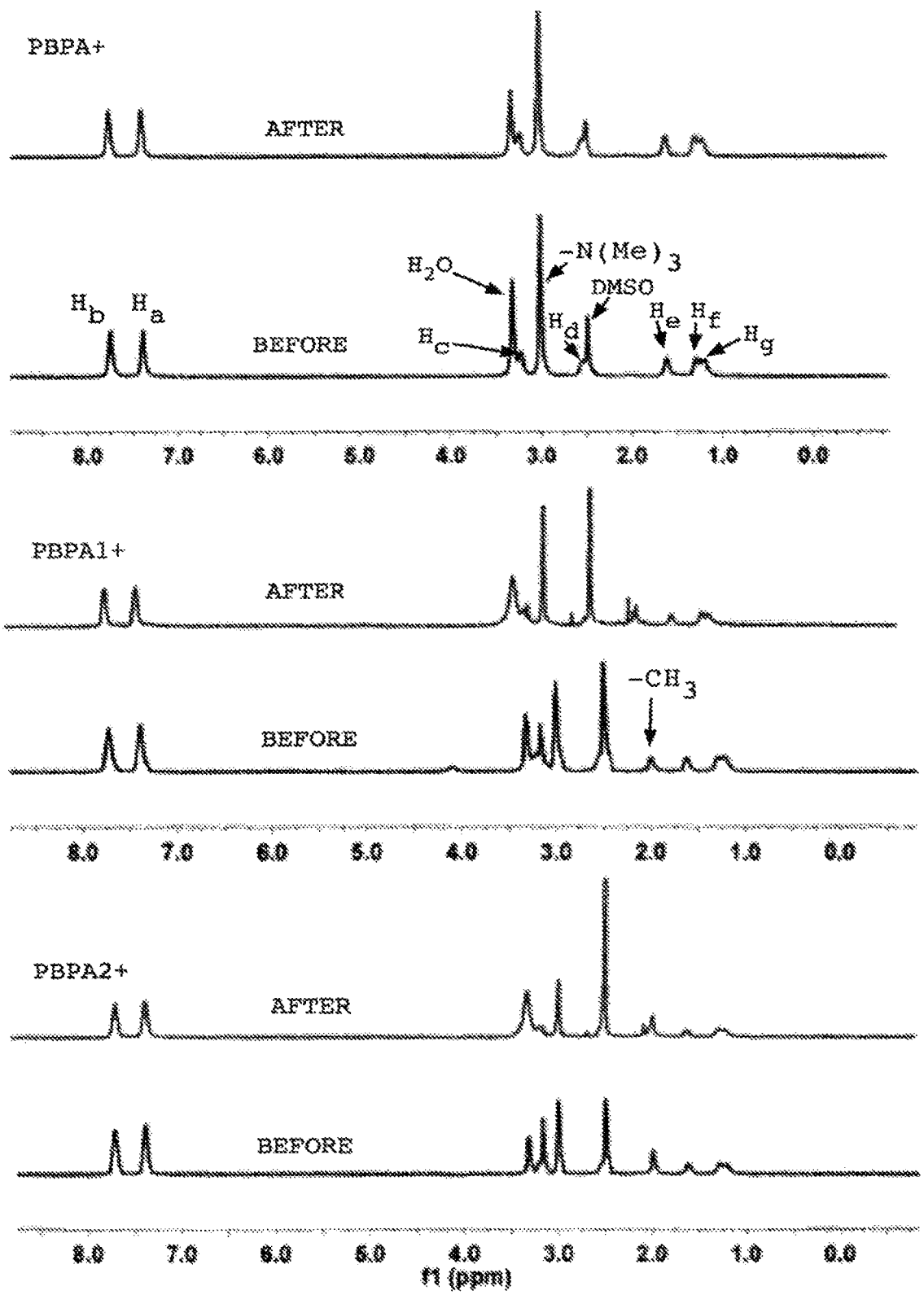
FIG. 3 shows ¹H NMR spectra of the three polyarylenes of FIG. 2 before and after alkaline stability tests.
Figure 4:
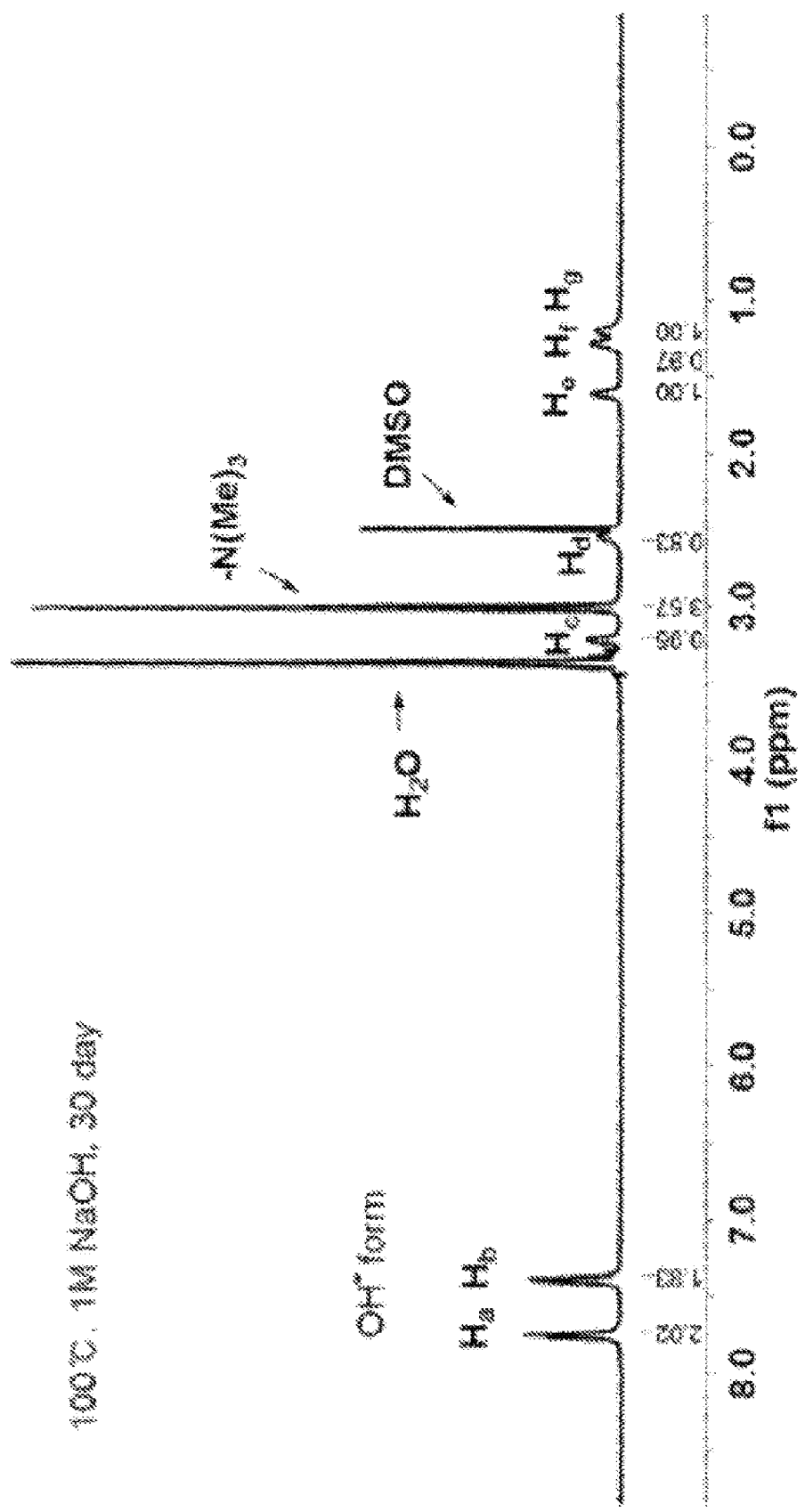
FIG. 4 shows a ¹H NMR spectrum of one of the three polyarylenes of FIG. 2 before and after an alkaline stability test.

FIG. 3 shows $^1$H NMR spectra for PBPA+, PBPA1+, and PBPA2+ before and after the 30-day alkaline stability test (1M NaOH, 80° C.) described above in Table 2. FIG. 4 shows $^1$H NMR spectra data for PBPA+ following another alkaline test (1M NaOH, 100° C., 30 days).

PBPA+, PBPA1+, and PBPA2+ are insoluble in water, tetrahydrofuran, trichloromethane (CHCl$_3$), and dichloroethene (CH$_2$Cl$_2$), but are soluble in N,N-dimethylformamide, dime thylsulf oxide, and methanol at room temperature. The quaternary ammonium groups of these polymers decomposed at 270° C., a thermal stability greater than that reported for QA poly(arylene ether sulfone)s. The precursor polymers (PBPA, PBPA1 , PBPA2) were thermally stable without decomposition up to 350° C.

The mechanical properties of AEMs are critically important in fuel cell applications. For each of the PBPA+, PBPA1+, and PBPA2+ polymers, the tensile strength and elongation at the break of the membranes were, respectively, 20-35 MPa and 40-140%, which meet the requirements for building membrane electrode assemblies (MEAs) in AEM fuel cells.

Figure 5:
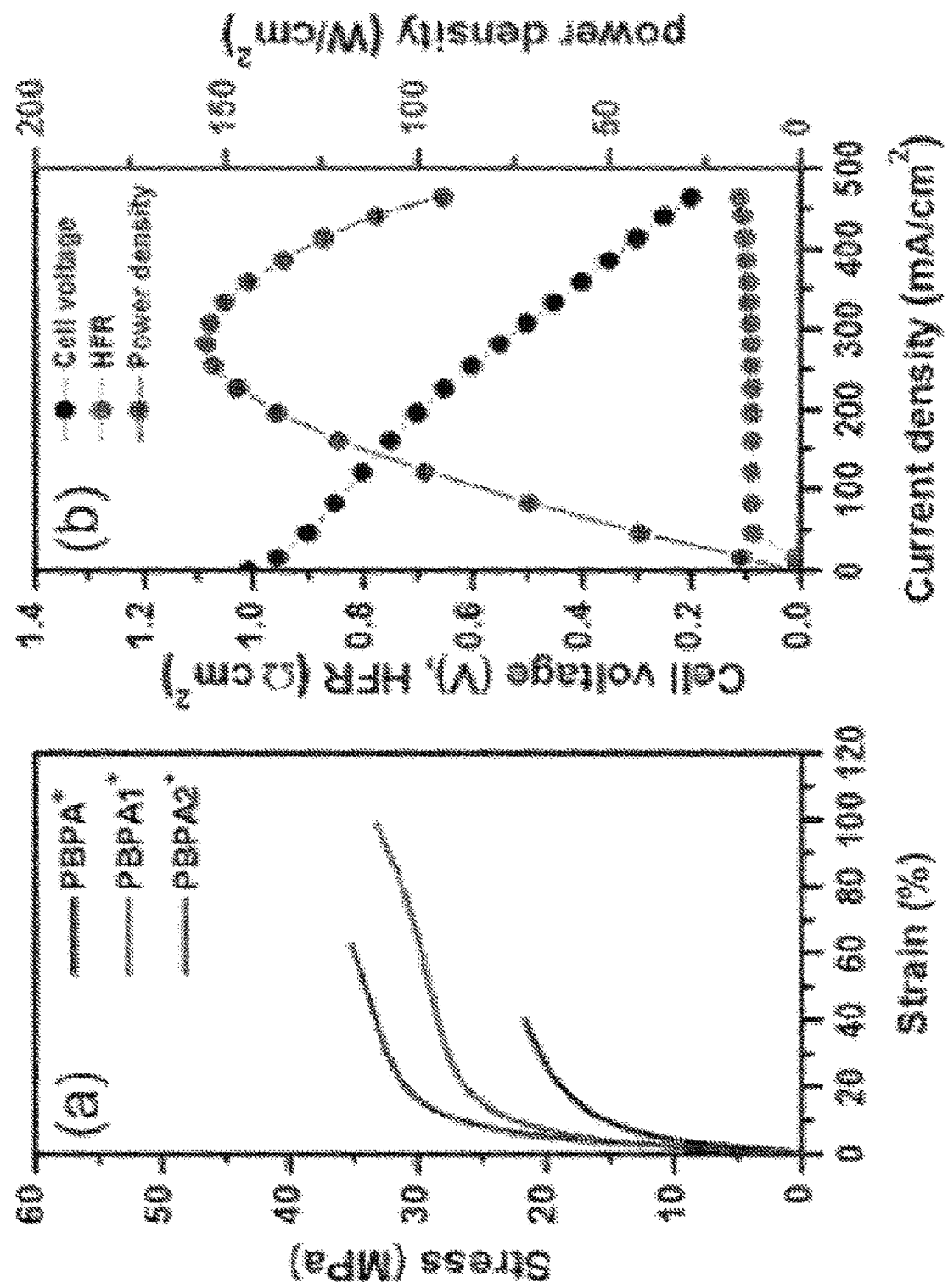
FIG. 5 shows (a) stress and strain curves of three polyarylenes according to embodiments of the invention and (b) $H_2/O_2$ polarization, high-frequency resistance, and power density curves of one of the three polyarylenes.

FIG. 5 show stress versus strain curves (panel (a)) for all three polymers. At 50° C. and 50% relative humidity, membranes comprising the polymer with the lowest IEC (PBPA2+) had a mechanical strength (35 MPa) greater than that of a membrane comprising PBPA+ (22 MPa), the polymer with the highest IEC. And compared to Diels-Alder poly(phenylene) AEMs (IEC=1.7 mequiv/g, 32 MPa maximum strength, 40% maximum strain), membranes comprising the PBPA1+polymer showed similar tensile strength (IEC=1.9 mequiv/g, 33 MPa maximum strength, 100% maximum strain) but significantly better elongation at break, likely due to its more flexible backbone structure having a quaternary sp$^3$ carbon. These mechanical strength data indicate that the polymers of the invention are tough and ductile enough for use as AEM materials in fuel cells.

Panel (b) of FIG. 5 shows the polarization curves of fuel cells containing PBPA1+ at 80° C. The open-circuit voltage (OCV) was 1.01 V, which is typical in hydrogen-supplied fuel cells. The maximum power density of 155 mW/cm$^2$ was obtained at 80° C. and the high-frequency resistance (HFR) of the cell was <0.1 Ωcm$^2$. While the membrane conductivity obtained from the HFR is 19.9 S/cm, lower than the value from the ex situ measurement due to the nonmembrane resistance contributions of the ME A, the HFR value reported here was much smaller than typical values found in literature reports of AEM fuel cells.

These results clearly demonstrate the superior chemical stability and fuel cell performance of QA poly(biphenyl alkylene)s according to the invention, as compared to other AEM materials.

Polyarylenes other than the poly(biphenyl alkylene)s described above are within the scope of the invention and may be manufactured according to similar methods. For example, methods of the invention may be employed to manufacture a polymer according to formula III

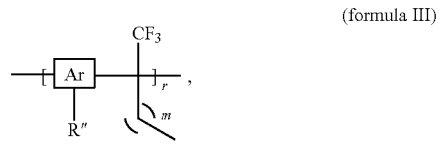

(formula III)

wherein Ar is an aromatic compound, R" is

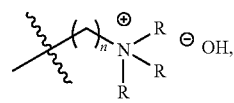

r is from 100 to 1,000,000, and m is from 0 to 20.

According to some embodiments of the invention, polymers of formula III may be manufactured according to Reaction 2 below, wherein Ar is a polyarylene, R' is

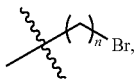

m is from 0 to 20, r is from 100 to 1,000,000, R is an aryl group, and R" is (Reaction 2)

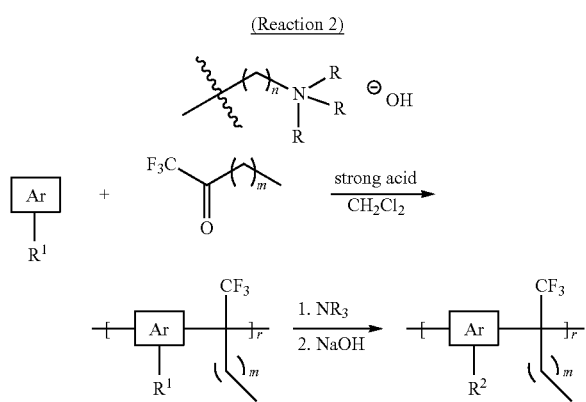

According to some embodiments of the invention, the aromatic compound selected from a group consisting of:

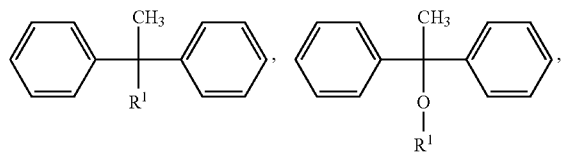

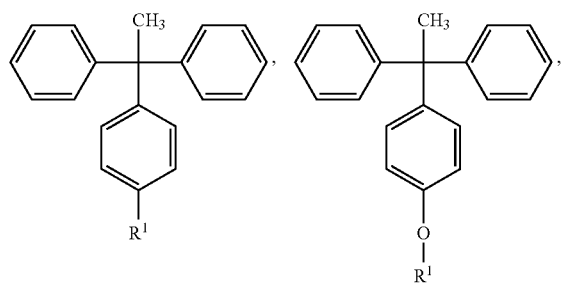

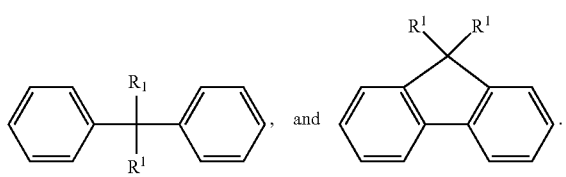

Other aromatic compounds may be employed, of course, as will be recognized by one skilled in art and are within the scope of the invention. Similarly, in some embodiments,

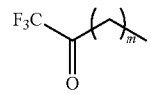

Finally, although the embodiments above include brominated aromatic compounds or ketones, other halogens may be employed. For example, 7-chloro-1, 1, 1-trifluoroaikyl trifluoroheptan-2-one could be employed to prepare a chloroalkylated precursor polymer, from which polymers according to the invention are prepared through nucleophilic substitution. In such embodiments, groups other than ammonium groups (e.g., alkyloxy, sulfonate, carboxylate, phosphonate) may be included in the resulting polymer.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any related or incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of forming a polyarylene, the method comprising: reacting an aromatic compound and a trifluoroalkyl ketone in the presence of a strong acid to form a haloalkylated precursor polymer; and reacting the haloalkylated precursor polymer with a quaternary ammonium group to form a polyarylene having a main chain free of ether linkages.

2. The method of claim 1, wherein the trifluoroalkyl ketone includes at least one trifluoroalkyl ketone selected from a group consisting of: 7-bromo- 1, 1, 1- trifluoroheptan-2-one and methyl trifluoromethyl ketone.

3. The method of claim 1, wherein the aromatic compound is selected from a group consisting of:

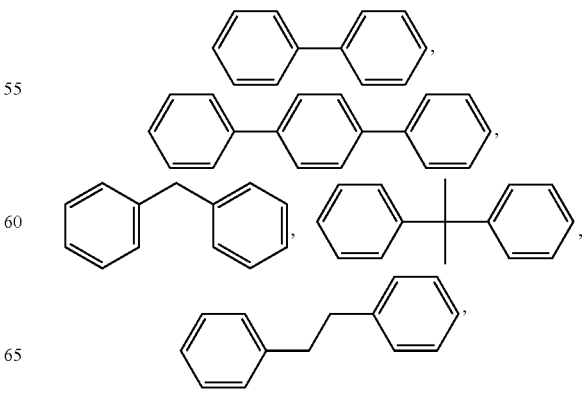

-continued

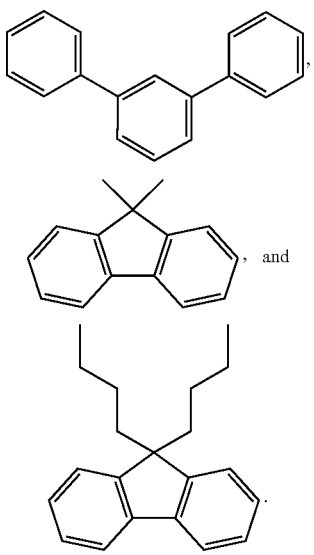

4. The method of claim 3, wherein the aromatic compound is

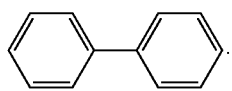

5. The method of claim 1, wherein the aromatic compound is selected from a group consisting of:

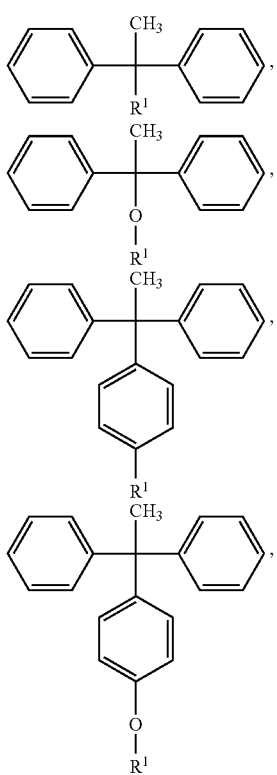

-continued

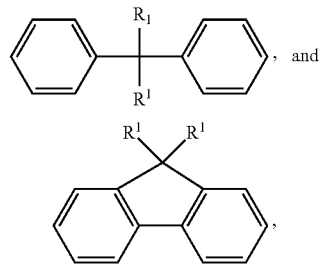

wherein each $R^1$ and $R^2$ is, independently, R', and each R' is, independently,

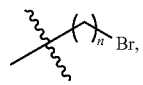

and wherein n is from 1 to 20.

6. A polymer of formula I prepared according to the method of claim 1

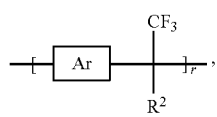

(formula I)

wherein Ar is an aromatic compound, r is from 100 to 1,000,000, and $R^2$ comprises a quaternary ammonium group.

7. The polymer of claim 6, wherein Ar is

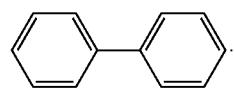 [SMILES: c1ccc(-c2ccccc2)cc1]

8. The polymer of claim 7 having formula IA

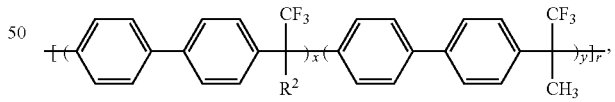

wherein x+y=1.

9. The polymer of claim 8, wherein x is 1 and y is 0, or x is 0.65 and y is 0.35, or x is 0.44 and y is 0.56.

10. The polymer of claim 6, wherein $R^2$ comprises

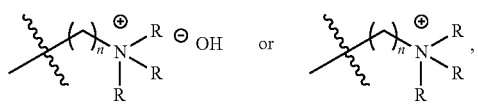

R is an alkyl group, and n is from 1 to 20.

11. A polymer according to formula I

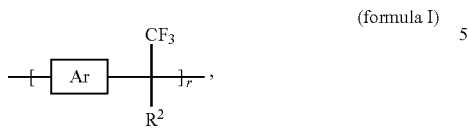

(formula I)

wherein Ar is an aromatic compound, r is from 100 to 1,000,000, and $R^2$ comprises a quaternary ammonium group.

12. The polymer of claim 11, wherein the aromatic compound is selected from a group consisting of:

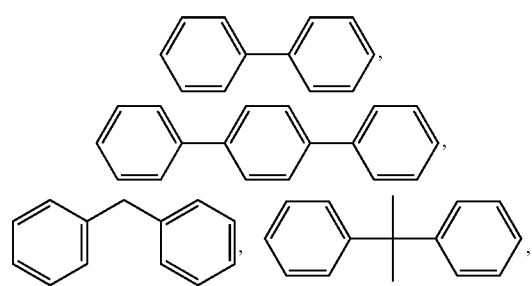

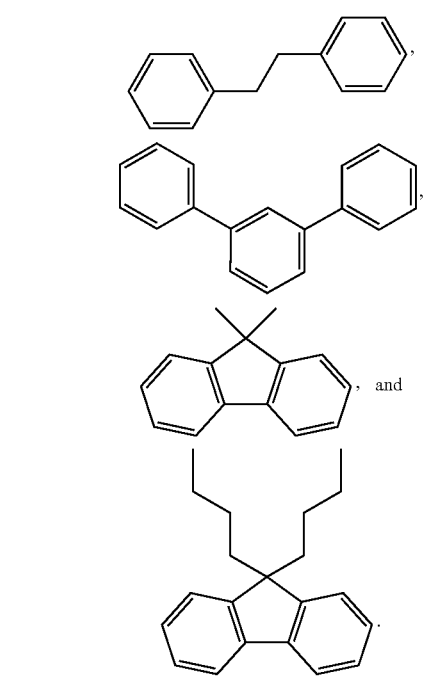

, and

13. The polymer of claim 11, wherein $R^2$ comprises

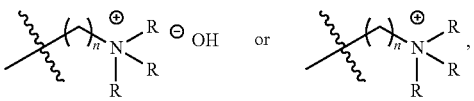

R is an alkyl group, and n is from 1 to 20.

14. The polymer of claim 11, prepared from a bromoalkylated precursor polymer of formula II according to the reaction:

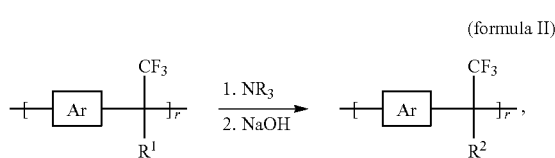

(formula II)

wherein $R^1$ is

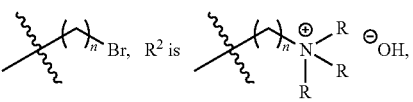

R is an alkyl group, and n is from 1 to 20.

15. The polymer of claim 14, wherein the bromoalkylated precursor polymer of formula II is prepared according to the reaction:

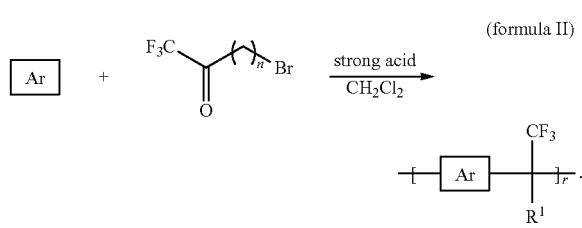

(formula II)

16. The polymer of claim 15, wherein the strong acid is trifluoromethanesulfonic acid.

17. The polymer of claim 11 having formula IA

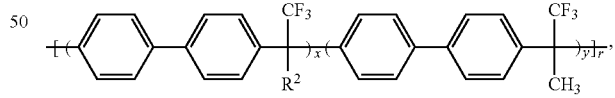

wherein x+y=1.

18. The polymer of claim 17, wherein x is 1 and y is 0, or x is 0.65 and y is 0.35, or x is 0.44 and y is 0.56.

* * * * *